Jan. 8, 1963

J. G. WHITE 3,072,412

HYDRAULIC PACKING GLAND

Filed Aug. 22, 1961

INVENTOR.
Joseph G. White

United States Patent Office 3,072,412
Patented Jan. 8, 1963

3,072,412
HYDRAULIC PACKING GLAND
Joseph G. White, Box 621, Maricopa, Calif.
Filed Aug. 22, 1961, Ser. No. 133,173
3 Claims. (Cl. 277—2)

This invention relates generally to packing glands, and more specifically to certain new and useful improvements in the construction and operation of such glands.

The conventional packing gland or stuffing box comprises a concentric counterbore extending inwardly about a shaft which is to be sealed. The counterbore is then packed with a suitable stuffing box material and an annular piston adapted to be received in the counterbore is positioned over the packing and is tightened down against the stuffing by means of bolts which extend through a radially extending flange projecting from the piston. The bolts are tightened with the purpose of compressing the packing or stuffing material evenly around the shaft which is being sealed. In practise, it is found very difficult to achieve an even pressure on all areas of the packing material due to the difficulty of advancing the piston evenly into the counterbore by means of the peripherally oriented bolts. Further, variations in wear on the packing material can only be detected by signs of leakage, and such wear must be taken up by individually tightening each of the surrounding bolts, an operation which can be exceedingly hazardous if the machinery is in continuous operation. My invention is directed to a packing gland which is operated hydraulically such that the packing rubbers or other stuffing material is subjected to equal pressure at all times and wherein wear to such material can be compensated for in a simple manner from a relatively remote location.

It is therefore a primary object of this invention to provide a hydraulically operated packing gland wherein pressure is supplied to the gland material in an even manner.

It is a further object of this invention to provide a hydraulic packing gland wherein the pressure which is applied to the stuffing is accurately recorded at all times such that any drop in the same may be compensated for before any leakage in the glands takes place.

It is a still further object of this invention to provide a packing gland which is hydraulically operated wherein means are provided to indicate when the stuffing material is worn out and needs replacement.

A full understanding of the construction of this invention, together with furthre novel features and advantages, will be had from the following detailed description of a preferred embodiment thereof, taken in conjunction with the attached drawings wherein.

Similar reference characters indicate corresponding parts throughout the several views in the drawing.

Figure 1:
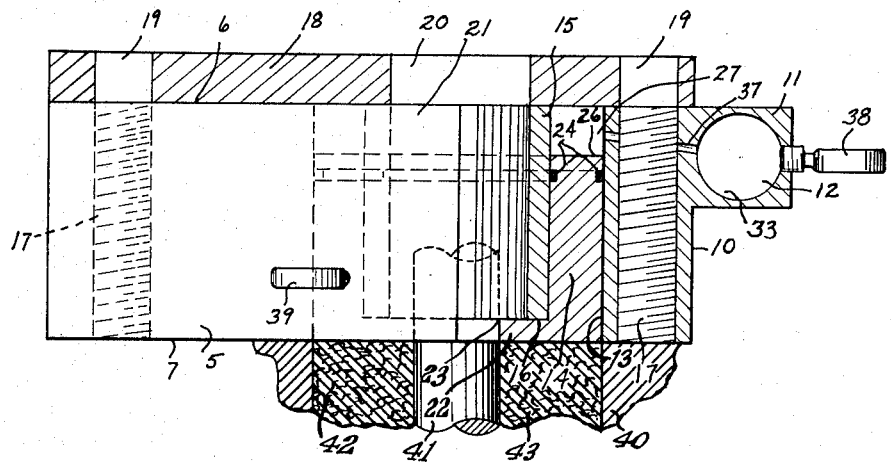
FIG. 1 is a side elevation of the packing gland shown partly in cross section.
Figure 2:
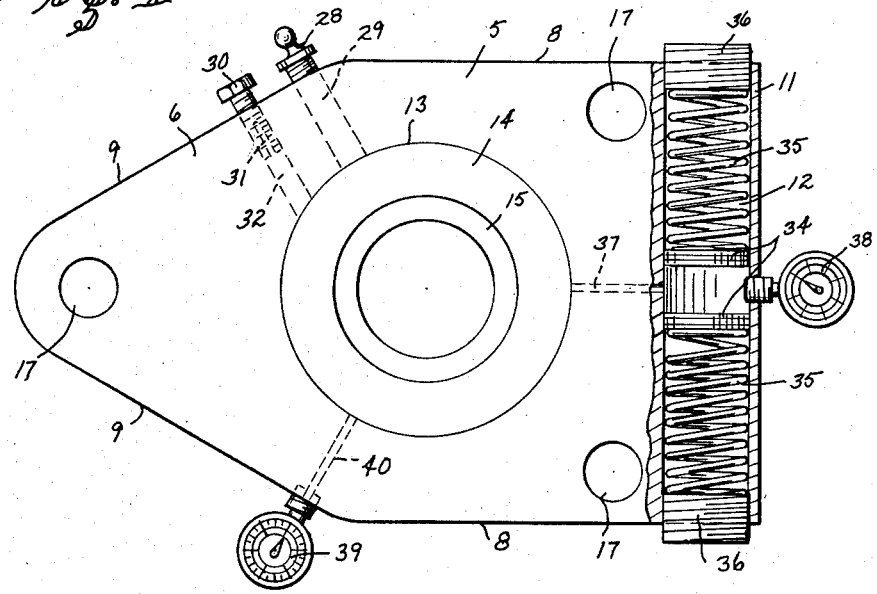
FIG. 2 is a plan view of the packing gland shown partly in cross section with the gland head removed.

Referring now to the drawings in detail, the numeral 5 represents the gland body which has upper and lower parallel faces 6 and 7, parallel opposed sides 8 which continue at one end with tapering sides 9 and connect at the other end with a square side 10. A square protrusion 11 extends along an upper portion of the square side 10 to house a compensator mechanism 12 to be described later. The gland body may form part of the pump body or general casting from which a shaft is protruding, or may be constructed as a separate component as indicated in the drawings. A cylindrical bore 13 extends normally between the upper and lower faces 6 and 7 of the gland body 5, and slideably receives the outer peripheral surface of an annular piston 14. A fixed sleeve 15 is mounted concentrically within the bore 13 and terminates inwardly of the lower face 7 as indicated at 16. Three mounting bolt holes 17 extend through the body in a symmetrically spaced relationship for securing the same to the pump mechanism and for retaining a head plate 18. The head plate has holes 19 which register with the holes 17, and is also provided with a bore 20 which is adapted to register with a bore 21 formed by the inner surface of the fixed sleeve 15.

The annular piston 14 is provided with a circular end plate 22 having a concentric shaft bore 23 formed therein for slideably engaging over the shaft which is to be sealed by the gland. The inner end of the piston is provided with annular grooves 24 and 25 for mounting O rings which sealingly engage with the cylindrical bore 13 and the outer surface of the fixed sleeve 15. The inner end 26 of the piston stops short of the upper face 6 to provide an annular fluid reservoir 27 for operating the piston.

A hydraulic fitting 28 is disposed on one of the tapering sides 9 of the gland body 5 and communicates through a passage 29 with the fluid reservoir 27. A pressure relief bolt 30 enters the gland body adjacent the hydraulic fitting and is provided with a slot 31 communicating through a passage 32 with the hydraulic fluid reservoir 27 such that relief of hydraulic pressure may be achieved by unscrewing the bolt such that the slot 31 extends outwardly of the casting.

The compensator mechanism 12 comprises a bore 33 extending longitudinally through the square protrusion 11 so as to slideably receive two opposed pistons 34. The pistons are restrained by compression springs 35 which are adjustably mounted in the ends of the bore by means of threaded plugs 36. A passage 37 extends between the fluid reservoir 27 and the center of the bore 33 such that hydraulic pressure within the reservoir is introduced between the opposed pistons 34. A pressure gauge 38 records the pressure present in the fluid reservoir 27 and is located in the square protrusion 11 intermediate the opposed pistons. A second pressure gauge 39 is mounted in a side 9 of the gland body and communicates with the cylindrical bore 13 towards the lower face 7 of the body. This gauge becomes operative when the piston 14 has been moved such that the inner end 26 thereof passes the passage 40 communicating with the gauge, thereby indicating that the piston has been extended to its fullest extent and that the gland packing must be replaced.

The operation of the above described packing gland is believed to be clear to those skilled in the art. The gland body is mounted on the pump or other piece of machinery 40 such that a shaft 41 protruding therefrom slideably extends through the shaft bore 23 formed in the annular piston 14. A counterbore 42 is formed in the casting around the shaft and is prepared to receive packing material 43 as is conventionally used and is also machined such that the piston 14 may project therein in order to pack the material. Hydraulic fluid is introduced through the fitting 28 until the desired packing pressure is attained, such pressure being registered by the pressure gauge 38. The hydraulic fluid will act on the inner annular end 26 of the piston to cause an even packing of the material around the periphery of the shaft. When the packing material becomes worn, the piston will extend into the counterbore and the pressure will be maintained to some extent by the compression springs 35 in the compensator mechanism 12. However, upon full extension of the piston, the passage 40 will become open to the hydraulic fluid such that the pressure gauge 39 will register a pressure equal to that at the gauge 38, indicating to the operator that the packing is worn out and must be replaced.

Having described the invention with considerable particularity, it should be understood that various modifications may be made to the detail thereof, without departing from the scope or spirit of the invention, as defined in the appended claims.

I claim:

1. A hydraulically operated packing gland for a shaft protruding from a pump and having a concentric counterbore formed about the shaft for receiving packing, and comprising, a gland body removably secured to the pump, a bore formed through the body registering with the counterbore, a head plate closing one end of the bore, a piston slideably mounted in the bore for engaging the packing disposed in the counterbore, a compensator mechanism mounted on the side of the body and communicating with the bore, means for introducing hydraulic fluid into the bore, a gauge for disclosing the pressure of the fluid, and a second gauge axially spaced with respect to the first gauge and communicating with the bore for indicating the full extension of the piston within the bore.

2. A hydraulically operated packing gland according to claim 1, wherein, a fixed sleeve is mounted concentrically within the bore terminating inwardly of one end thereof, said piston having an annular portion sealingly engaging intermediate the sleeve and the bore and having an end plate for engaging the packing, said end plate having a shaft bore formed therethrough to receive the shaft.

3. A hydraulically operated packing gland according to claim 1, wherein, said compensator mechanism comprises a square protrusion having a bore formed therethrough, opposed pistons mounted within the bore, said pistons being urged towards the center of the bore by compression springs adjustably secured in each end of the bore by threaded plugs, and a passage communicating between the bore in the body and the center of the bore in the protrusion.

References Cited in the file of this patent

UNITED STATES PATENTS

| | | |
|---|---|---|
| 512,551 | Kelley | Jan. 9, 1894 |
| 2,670,973 | Ginther et al. | Mar. 2, 1954 |
| 2,731,282 | McManus et al. | Jan. 17, 1956 |